United States Patent [19]
Gerszberg et al.

[11] Patent Number: 5,956,631
[45] Date of Patent: Sep. 21, 1999

[54] MULTIPLE TERMINAL DEVICE RINGING DIGITAL SUBSCRIBER ISDN TERMINAL

[75] Inventors: Irwin Gerszberg, Kendall Park; Eugene Thomas Kendig, Brick Township, Ocean County; Richard F. Pace, Washington; Jesse Eugene Russell, Piscataway, all of N.J.

[73] Assignee: Lucent Technologies, Inc., Murray Hill, N.J.

[21] Appl. No.: 08/704,335

[22] Filed: Aug. 27, 1996

Related U.S. Application Data

[63] Continuation of application No. 08/175,657, Dec. 30, 1993, abandoned.

[51] Int. Cl.⁶ ........................................ H04Q 7/38
[52] U.S. Cl. ............................. 455/403; 379/167
[58] Field of Search .............................. 455/403; 379/167

[56] References Cited

U.S. PATENT DOCUMENTS

| | | | |
|---|---|---|---|
| 4,656,624 | 4/1987 | Collins et al. | 370/60 |
| 4,864,601 | 9/1989 | Berry et al. | 379/96 |
| 5,010,565 | 4/1991 | Nash et al. | 379/61 |
| 5,040,177 | 8/1991 | Martin et al. | 370/110.1 |
| 5,208,812 | 5/1993 | Dudek et al. | 370/100.1 |
| 5,228,026 | 7/1993 | Albrow et al. | 370/29 |
| 5,265,150 | 11/1993 | Helmkamp et al. | 379/58 |
| 5,297,191 | 3/1994 | Gerszberg | 379/59 |
| 5,365,573 | 11/1994 | Sakamoto et al. | |
| 5,404,355 | 4/1995 | Raith | 370/95.1 |
| 5,454,032 | 9/1995 | Pinard et al. | 379/167 |
| 5,600,709 | 2/1997 | Hoflinger | |

OTHER PUBLICATIONS

Kitami, Ogawa, "Current Role and Future Evolution of the ISDN Signaling System in NTT's Network", IEEE Communications Magazine, Jul. 1990.

*Primary Examiner*—William Cumming

[57] ABSTRACT

A telephone communication system addresses calls to a particular subscriber via both a wired terminal and through the wired terminal by radio to a wireless communicator device. The wired terminal is hard wired to a telephone network and the wireless device is coupled by radio to the wired terminal which is in turn hardwired to the telephone network. Both the wired terminal and the wireless communicator ring in response to an incoming call and the call may be answered by the subscriber via either device.

4 Claims, 4 Drawing Sheets

WIRELESS DUAL RINGING COMMUNICATION SYSTEM

INTELLIGENT DUAL RINGING WIRELESS BRI LANDLINE DIGITAL TERMINAL WITH ATTACHED HANDSET AND WIRELESS HANDSET

FIG. 3  CALL PROCESS FLOW

MULTIPLE TERMINAL DEVICE RINGING DIGITAL SUBSCRIBER ISDN TERMINAL

This is a Continuation of application Ser. No. 08/175,657 filed Dec. 30, 1993, now abandoned.

FIELD OF THE INVENTION

This invention relates to telephone communication systems and to apparatus and a method of communicating with both wired and wireless terminal devices. In particular accessing a subscriber recipient of a call is facilitated with the recipient's ability to receive a call either on a wired subscriber terminal or a wireless communicator device communicating by radio with the wired subscriber terminal.

BACKGROUND OF THE INVENTION

Telephone subscribers are normally limited in the ability to receive telecommunication messages by the access number assigned to a particular telecommunication device. If the subscriber is not within the vicinity of such a device he/she is unable to personally respond to an incoming call.

Services are presently provided to enable a subscriber to receive calls independently of a fixed telephone reception number. In some of these services the subscriber alerts a database of his present reception number and callers wishing to reach the subscriber may access that reception number by calling a translation number (e.g. such as an 800,900 number) assigned to that particular subscriber. Such an arrangement is not automatic however in that it fails if the subscriber fails to access and provide the data base with the current number at which he/she may be reached.

A subscriber may choose to utilize wireless telephone equipment such as a cellular radiotelephone to assure that calls will follow subscriber via the cellular or a wireless radiotelephone terminal. However the use of wireless radiotelephone service tends to be considerably more expensive than wired telephone service.

SUMMARY OF THE INVENTION

A telephone communication system in accord with the invention addresses calls to a particular subscriber via both a wired terminal and through the wired terminal by radio to a wireless communicator device. The wired terminal is hard wired to a telephone network and the wireless device is coupled by radio to the wired terminal which is in turn hardwired to the telephone network. Both the wired terminal and the wireless communicator ring in response to an incoming call and the call may be answered by the subscriber via either device. The telephone communication system permits communication with a roaming wireless radiotelephone communicator.

In a particular illustrative embodiment each wired and wireless subscriber terminal is connected to a wireless base unit operative as a radio port serving a wired handset and a plurality of wireless communicators. The individual wireless base units communicate with nearby wireless base units and each unit maintains a database of call setups, of nearby wireless base units, so that it may cooperate with these base units in assigning calls and for facilitating handovers from one wireless base unit to another. This co-operative aspect of the wireless base units is discussed in the previous filed application Ser. No. 08/158,088 filed Nov. 24, 1993.

Each wireless base unit is connected to a subscriber digital or ISDN terminal which includes a wired subscriber interface or handset and an associated wireless communicator operating with the same subscriber called number as the wired interface. In the illustrative embodiment the wired subscriber terminal is an Integrated Service Digital Network (ISDN) terminal.

An incoming call through the local exchange carrier (LEC) is directed to a wireless base unit and from thence to the subscriber ISDN terminal. Both the wired handset and the wireless communicator ring and calls may be received through the wired subscriber interface and the wireless communicator. If the subscriber is away from the wired interface and out of range of his/her wireless base unit the call will be processed in the same manner in which a wireless telephone system locates and services a roamer with a wireless communicator. Call routing to a roamer is under control of the subscribers home wireless base unit (e.g. an intelligent radio port) which maintains a data base for facilitating location of the subscriber.

DETAILED DESCRIPTION

Figure 1:
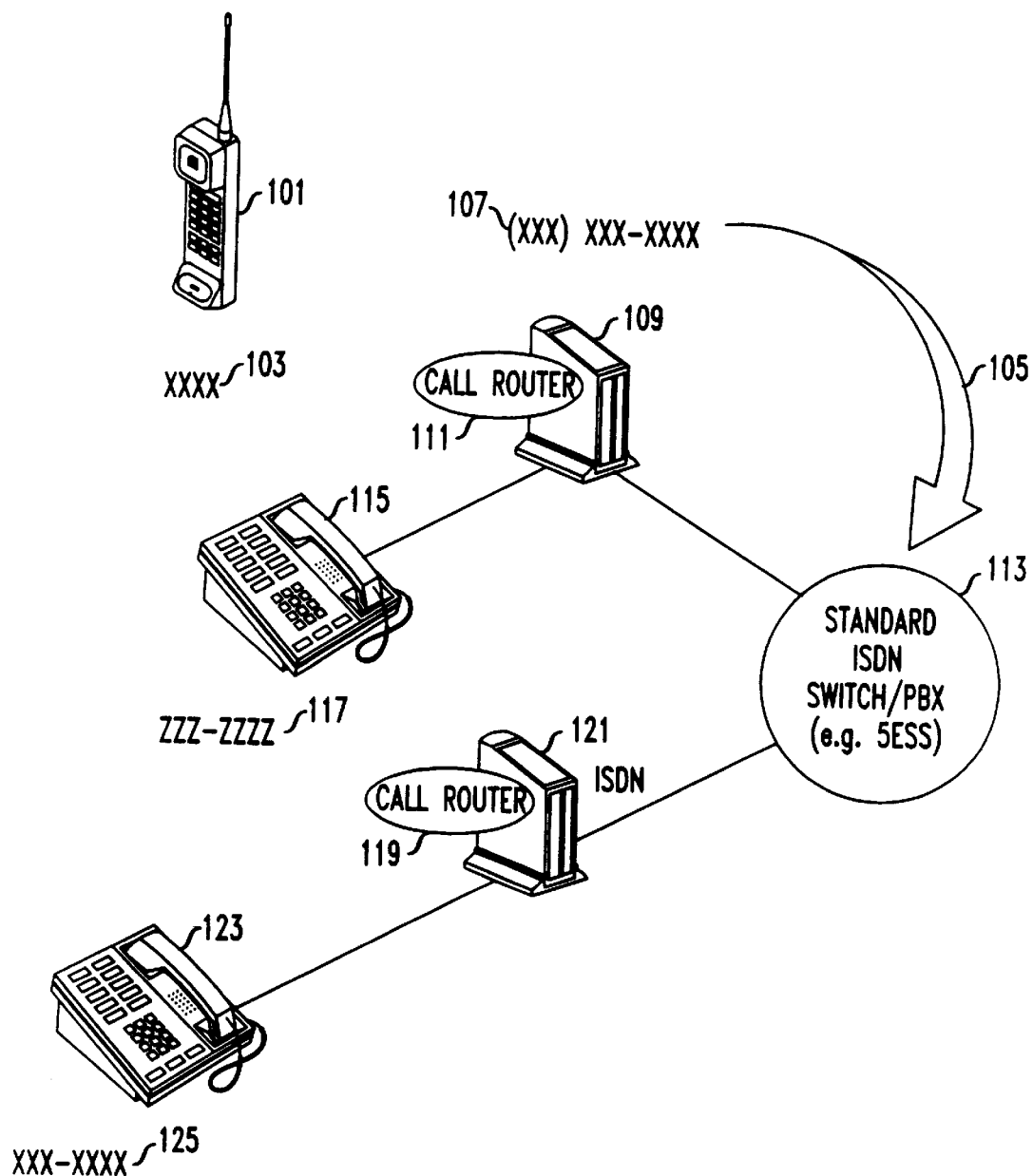
FIG. 1 is a schematic of a telecommunications system utilizing dual ringing of dual receiving devices in receiving calls.

A wireless communication system such as shown in schematic form in the FIG. 1 interconnects an ISDN switch 113 of a landline telephone network to a plurality of wireless base units 109 and 119 each associated with and connected to subscriber digital ISDN terminals 115 and 123 respectively. The wireless base units are intelligent radio ports such as are described in the copending patent application Ser. No. 08/158,088 filed Nov. 24, 1993 and entitled "Radio Telephone Communication System Architecture with Direct Communication Between Intelligent Radio Ports". In this system the wireless base units communicate with each other to establish a database of wireless communicators with which they may communicate.

Each of the subscriber ISDN terminals 115 and 123 is a combination wireless and wired ISDN radio telecommunication device including a wired handset subscriber terminal and a radio telecommunication device for communicating with a wireless communicator. Each subscriber ISDN terminal is connected with a Bit Rate Interface (BRI) interface wired connection to the ISDN switch 113 of a landline telephone network. Each subscriber ISDN terminal is digital and includes an ISDN phone capability and a wireless base unit or radio port capability to communicate with an associated wireless communicator shown as the handset 101.

The routing of calls from the landline switch 113 to the wireless communicators 101 is controlled by data that is contained in call router databases 111 and 119 associated and located within wire less base units 109 and 121 each associated in turn with each of the subscriber terminals 115 and 123.

The operation of the system may be best exemplified by a description of the handling of a call directed to the subscriber which has originated from the landline telephone network. An incoming call addressed to a LEC number (xxx)

xxx-xxxx 107 is directed through a particular ISDN switch 113 for a subscriber associated with one of the service area wireless base units such as 109 or 119. The service area wireless base units are, as described above, each supporting a wired termination and a wireless coupling to a wireless handset associated with a subscriber ISDN terminal 115 and 123. For each ISDN terminal the wireless handset and wired handset are receptive to the same telephone number 107.

The wireless base units keep track of the wireless communicators. The wireless base unit 121 for example, sends out a paging signal to the dual subscriber ISDN terminal 123. As shown in the FIG. 1 the subscriber's handset is in the vicinity of the wireless base unit 109 and its associated dual subscriber terminal 115 and hence any wireless communication is to be served through the dual terminal 115. The wireless communicator registers with its nearest wireless base unit in the same manner as is common in many wireless communication systems such as cellular and related systems. Hence if a wireless communicator has been removed from the vicinity of its associated digital subscriber ISDN terminal (i.e. roaming) calls may be directed through the nearest ISDN terminal in the vicinity of the wireless base unit closest to the wireless communicator unit. In such a call the individual control 215 of the ISDN subscriber terminal causes a transmission of the call to the wireless communicator 101 without ringing at the digital ISDN subscriber terminal itself or at its associated wireless communicator.

In accord with the system operation, such as described in the application Ser. No. 08/158,088 filed Nov. 24, 1993, when the handset 101 entered the service area of the subscriber ISDN terminal terminal 115 and wireless base unit 109 a registration number was recorded by the call router 111. The wireless base unit 109 communicates via radio communication with the home wireless base unit 119 of the handset 101 providing for inclusion in its data base the location of the handset 101. This forwarding information is utilized by the ISDN switch 113 to address this call to the wireless base unit 109 and its associated dual ISDN terminal 115. This call direction causes the handset to ring simultaneously with the wire termination of the dual ISDN terminal 115 for the reception of the subscriber.

Figure 2:
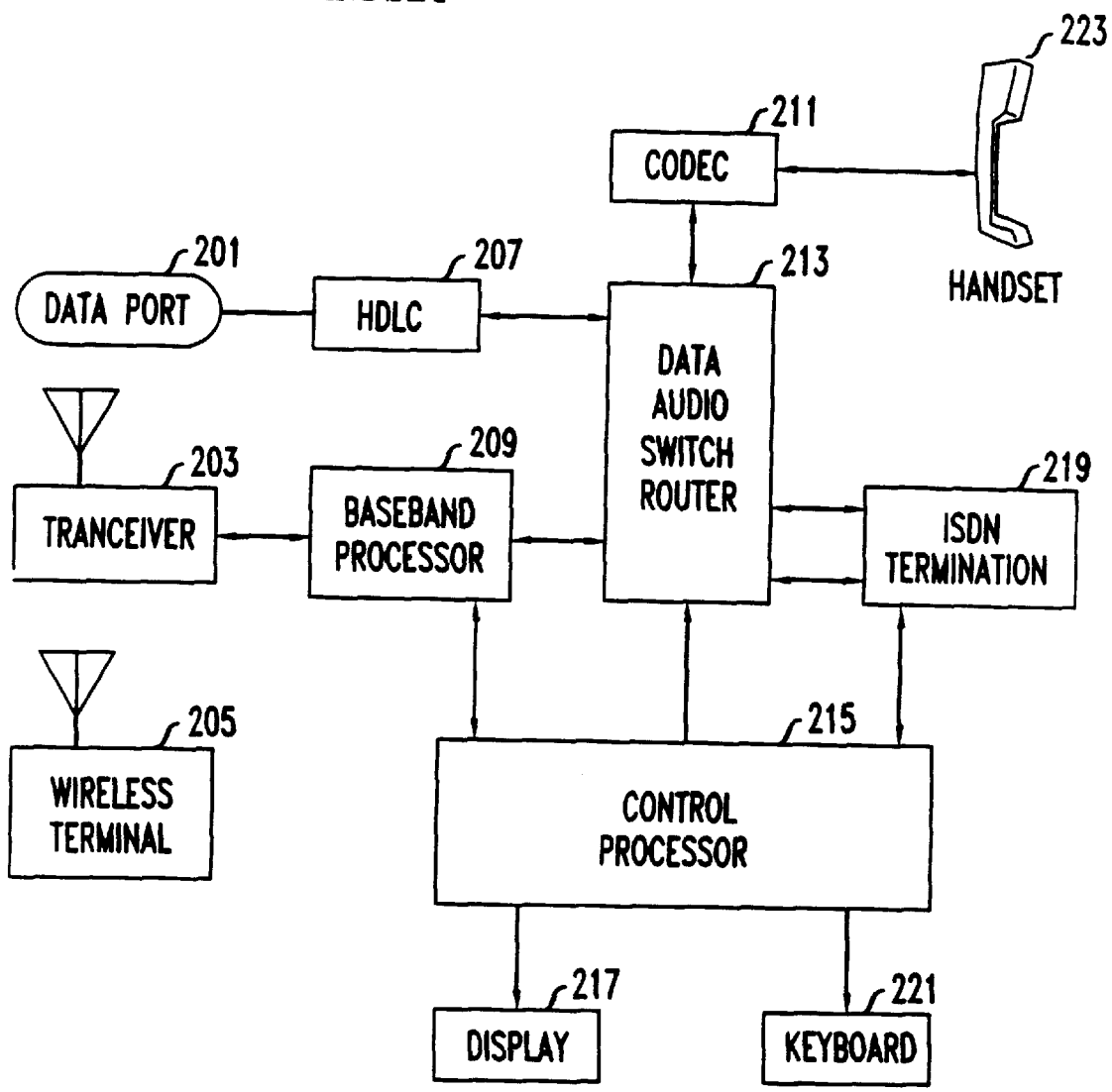
FIG. 2 is a block schematic of a digital ISDN subscriber terminal including a wired and wireless handset for subscriber use.

A digital ISDN subscriber terminal 115/123 with wired and wireless handsets and suitable for use in the system of FIG. 1 is shown in the block schematic of FIG. 2. It is connected to a landline telephone networks, via wireless base unit ISDN termination 219 which is in turn coupled to the landline ISDN switch 113 via a BRI interface as shown in the FIG. 1. A data audio switch router 213 is connected to the ISDN termination 219 and controls the flow of data and voice signals. Data signals are coupled to the high level data link controller (HDLC) 207 and voice signals are coupled to the codec 211 which encodes and decodes and couples the voice signals to the wired handset 223.

The subscriber terminal has a data port 201 attached to it which is operative as a user interface and a modem for receiving data for transmission to the telephone network or for data output. The data port 201 is connected to the HDLC 207 which couples the data signals to and from the data audio switch router 213.

Voice signals to the wireless transceiver 203 are transmitted, via a baseband processor 209, to the data audio switch router 213. The baseband processor converts the outgoing signal stream into a signal suitable for radio transmission by the transceiver 203 and converts received radiotelephone signals to baseband frequencies. Incoming calls from the landline telephone network are broadcast by the wireless terminal 205 in parallel with transmission to the wired handset 223.

A control processor 215 under control of a stored program controls the operation of the baseband processor, the data audio switch router 213 and the ISDN termination 219. In the case of roaming wireless communicators the control allows the wireless base unit to forward calls through the ISDN subscriber unit to the roaming wireless communicator 101 without causing ringing of the immediate ISDN subscriber terminal. A keyboard 221 permits control input to the control processor 215 and a display 217 permits monitoring of the control processor and readout of status information from the control processor.

Figure 3:
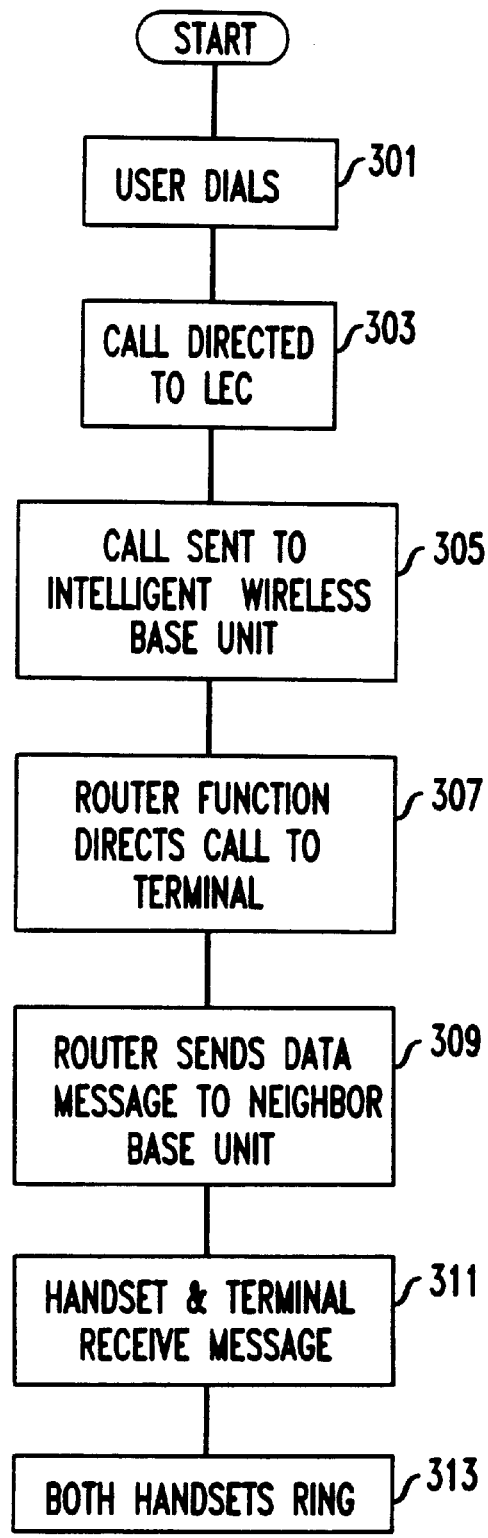
FIG. 3 is a flow diagram of method of the operation of the system of FIG. 1.

The flow process of system operation is shown in the FIG. 3. As shown a telephone user dials a number as indicated in the block 301 and the call is directed, as per block 303, by the telephone network to the LEC of the intended recipient. The local ISDN switch directs the call to the wireless base unit serving the subscriber as shown in the block 305. The router data base of that wireless base unit, as shown in the block 307, directs the call to the subscriber's ISDN subscriber terminal. In instances of roaming of the subscriber the router sends data to neighboring wireless base units via radio communication as per block 309, concerning the location of the subscriber recipient. The wired and wireless handset located in the vicinity of the subscriber are accessed as per block 311 and both the wired handset at recipient ISDN terminal and the associated wireless handsets ring as per block 313.

Figure 4:
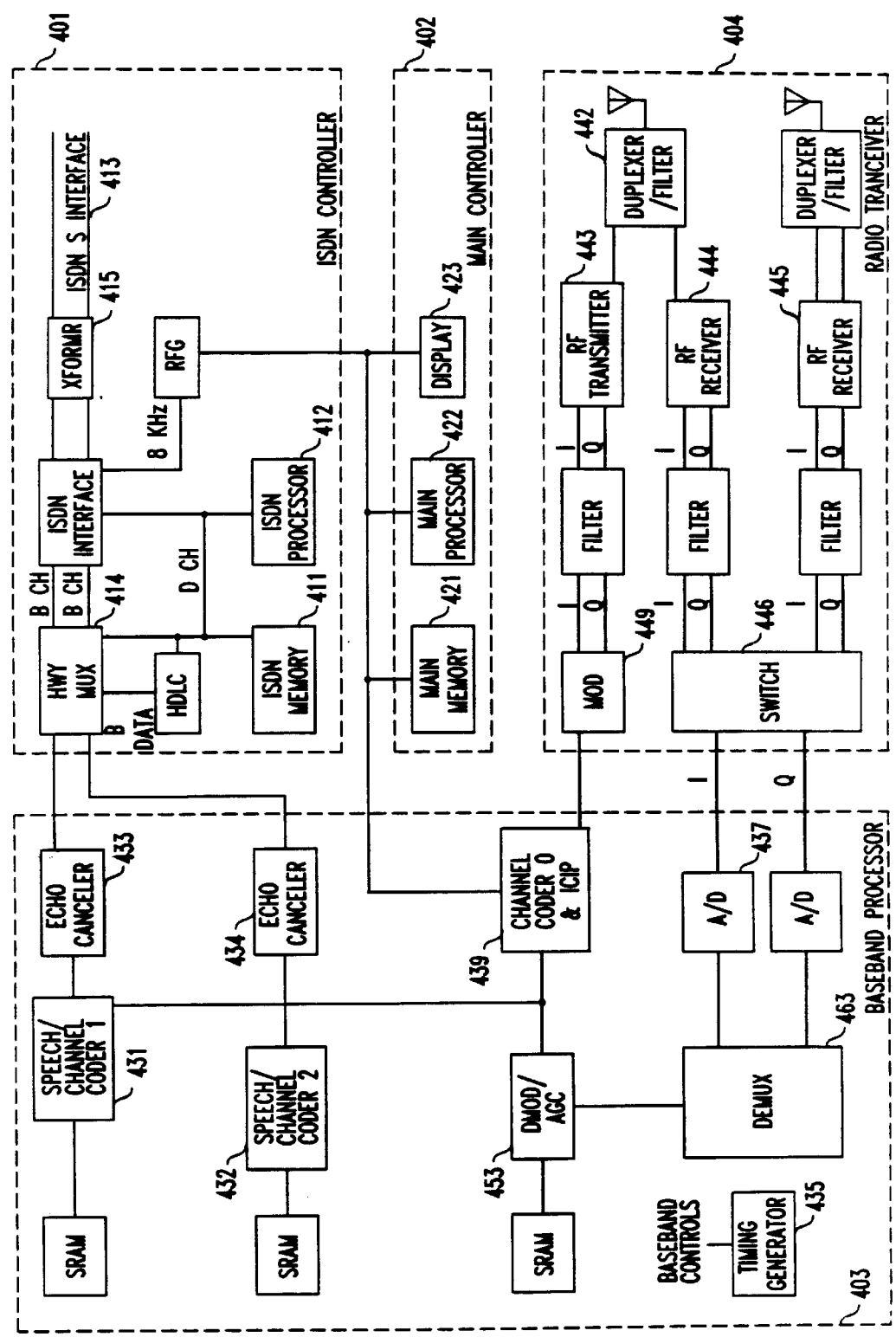
FIG. 4 is a block schematic of an intelligent wireless base station.

An intelligent wireless base station, such as disclosed in the filed application Ser. No. 08/158090, filed Nov 24, 1993, and suitable for use in the present system, is shown in the block schematic of FIG. 4 is a wireless-landline interface which is designed to connect to a landline telephone network at the S/T reference point with a connection that is similar or identical to connections used by ordinary telephone subscriber equipment. Landline originated calls intended for a digital subscriber ISDN terminal are routed to the wireless base station as if it is a subscriber telephone set. The wireless base station then sets up a wireless call is connected to the digital subscribe set shown in FIG. 2 which sets up the desired connection with the subscriber via a wired or wireless connection The wireless base station maintains a database of nearby wireless base stations, also connected to the landline network and their respective channel strengths, and exchanges this information with nearby wireless base stations. This information exchange is used to allow the transfer of calls from one wireless base station to a neighbor wireless base station via a handover process.

This wireless base station includes the main operational modules of an ISDN controller and interface 401, a main controller 402, a baseband processor 403 and a radio transceiver 404. The ISDN controller and interface includes an ISDN memory 411, an ISDN processor 412, an ISDN interface 413, a highway multiplexer 414 and an interface transformer 415. The ISDN interface provides a Basic Rate Interface (BRI) 2B+D connection to the landline telephone network, and which are also shown as connected to the multiplexer 414. The B channels are used for audio or data traffic of the customer and the D channel is used for signaling and user information across the network and for peer-to-peer communications. The ISDN processor 412 controls the highway multiplexer 414.

The baseband processor 403 interconnects audio signals from the ISDN control and interface to the radio transceiver. Audio signals received from the from the ISDN interface are coded, modulated and passed to the radio transceiver 404. The reverse process flow is also performed. It includes speech channel coders 431 and 432 for providing speech and channel coding and which are coupled to the multiplexer 414 of the ISDN controller and interface 401. It also includes echo cancelers 433 and 434 and a baseband timer 435. It is coupled to the radio transceiver 404 by a demodulator 453 and a demultiplexer 463 the A/D converters 437 and 438 and a channel coder 439.

The radio transceiver 404 includes two antennas 441 and 442, and an RF transmitter 443 and two RF receivers 444 and 445. The receivers are connected to the A/D converters 437 and 438 of the baseband processor by a switch 446. The transmitter is connected to an RF modulator 449 which connects it to the baseband processor.

The main controller 402 operates as a communication link between the baseband processor 403 and the ISDN control and interface is a digital interface arrangement and includes a stored program control that controls the overall message flow and processes within the wireless base station. It includes a main memory 421, a main processor 422 and an access unit and display 423. It controls message processing and translations for message flow between the baseband processor 403 and the ISDN control and interface 401. In addition to controlling message processing, it controls system initialization and testing and control of various sub units of the modules such as the radio transceivers modules and the various converters.

The wireless base station is connected to the digital subscriber ISDN terminal via lead 460 interconnecting the ISDN interface 461 of the wireless base unit to the ISDN termination 219 of the digital subscriber set of FIG. 2.

This invention claimed is:

1. In a telecommunication system including a plurality of intelligent wireless base units for communicating between a landline telephone network, a plurality of digital subscriber terminals connected to the landline telephone network through the wireless base units and a roaming wireless communicator associated with one of the plurality of digital subscriber terminals, each digital subscriber terminal comprising:

a wired handset connected to the landline telephone network with wire connections and circuitry including an ISDN termination connected through one of the plurality of wireless base units to an ISDN switch of the landline telephone; and radio communication means connected to the ISDN termination for providing radio communication between the roaming wireless communicator and the ISDN termination such that if the wireless communicator is associated with the digital subscriber terminal, both the wired handset and the roaming wireless communicator ring simultaneously in response to an incoming call from the landline network, and if the wireless communicator is not associated with the digital subscriber terminal, the wired handset does not ring.

2. In a telecommunication system as claimed in claim 1, comprising:

the digital subscriber terminal including a data port and a data audio switch router for coupling data from the ISDN termination to the data port.

3. A telecommunication system including wired and wireless telecommunication, comprising:

a plurality of wireless base units each connected to an ISDN switch included in a landline telephone network, each wireless base unit including means for storing data relating to subscriber units with which the wireless unit may communicate; and a plurality of digital subscriber terminals, each digital subscriber terminal connected to one of the plurality of wireless base units, each digital subscriber terminal including a wired handset connected to the landline telephone network by wired connections including an ISDN termination, and a wireless communication means having a radio transceiver connected to the ISDN termination and a roaming wireless communication associated with one of the plurality of digital subscriber terminals operating to receive telephone signals from the radio transceiver such that if the wireless communication is associated with the digital subscriber terminal, both the wired handset and the wireless roaming communicator ring simultaneously in response to the incoming call from the landline telephone network, and if the wireless communication is not associated with the digital subscriber terminal, the wired handset does not ring.

4. A telecommunications system including wired and wireless telecommunication, as claimed in claim 3, each digital subscriber terminal further comprises a control device for controlling transmission of a call from the wireless base to which it is connected and to a roaming wireless communicator other than the wireless communicator assigned to the digital subscriber terminal transmitting the call.

* * * * *